(12) United States Patent
Thomas et al.

(10) Patent No.: US 10,563,522 B2
(45) Date of Patent: Feb. 18, 2020

(54) COMPOSITE AIRFOIL FOR A GAS TURBINE ENGINE

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Ted J. Freeman, Danville, IN (US); Jeffrey A. Walston, Indianapolis, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 818 days.

(21) Appl. No.: 14/797,916

(22) Filed: Jul. 13, 2015

(65) Prior Publication Data
US 2016/0177743 A1 Jun. 23, 2016

Related U.S. Application Data

(60) Provisional application No. 62/053,551, filed on Sep. 22, 2014.

(51) Int. Cl.
*F01D 5/28* (2006.01)
*F01D 5/18* (2006.01)
*F01D 5/14* (2006.01)

(52) U.S. Cl.
CPC .............. *F01D 5/282* (2013.01); *F01D 5/147* (2013.01); *F01D 5/18* (2013.01); *F01D 5/284* (2013.01); *F05D 2300/20* (2013.01); *F05D 2300/6033* (2013.01); *Y02T 50/672* (2013.01); *Y02T 50/676* (2013.01)

(58) Field of Classification Search
CPC . F01D 5/282; F01D 5/147; F01D 5/18; F01D 5/284; F01D 5/3084; F05D 2300/20; F05D 2300/6033
See application file for complete search history.

(56) References Cited

U.S. PATENT DOCUMENTS

| 6,451,413 B1 | 9/2002 | Holowczak et al. |
| 6,451,416 B1 * | 9/2002 | Holowczak ............. B32B 18/00 264/125 |
| 6,464,456 B2 * | 10/2002 | Darolia ................... F01D 9/042 415/134 |

(Continued)

FOREIGN PATENT DOCUMENTS

| EP | 1930548 A2 | 6/2008 |
| GB | 2230259 A | 10/1990 |

OTHER PUBLICATIONS

Extended European Search Report, European Application No. 15179946.7-1610 / 2998510, dated May 24, 2016, 9 pages.

*Primary Examiner* — Christopher Verdier
*Assistant Examiner* — Michael L Sehn
(74) *Attorney, Agent, or Firm* — Barnes & Thornburg LLP

(57) ABSTRACT

Stationary vanes and rotating blades of a gas turbine engine are disclosed that include airfoils formed from ceramic matrix composite materials. The airfoils include at least one layer of ceramic-containing matrix material and ceramic-containing reinforcing fibers suspended in the matrix material. A core of the airfoils is surrounded by the at least one layer of ceramic-containing fiber/matrix material.

18 Claims, 2 Drawing Sheets

Fig. 3

(56) References Cited

U.S. PATENT DOCUMENTS

| | | | |
|---|---|---|---|
| 7,066,717 B2 | 6/2006 | Morrison et al. | |
| 7,258,530 B2 * | 8/2007 | Morrison | F01D 5/147 |
| | | | 29/889.71 |
| 7,481,621 B2 * | 1/2009 | Campbell | F01D 5/08 |
| | | | 415/115 |
| 7,600,978 B2 * | 10/2009 | Vance | F01D 5/147 |
| | | | 416/230 |
| 7,600,979 B2 | 10/2009 | Steibel et al. | |
| 7,887,300 B2 | 2/2011 | Mazzola et al. | |
| 8,235,670 B2 | 8/2012 | Morrison et al. | |
| 8,685,868 B2 | 4/2014 | Bouillon et al. | |
| 8,696,319 B2 | 4/2014 | Naik | |
| 2009/0324878 A1 * | 12/2009 | Steibel | C04B 35/573 |
| | | | 428/113 |
| 2013/0084189 A1 * | 4/2013 | Diego | C04B 37/001 |
| | | | 416/241 B |
| 2013/0142660 A1 | 6/2013 | McCaffrey | |
| 2014/0271153 A1 | 9/2014 | Uskert et al. | |

* cited by examiner

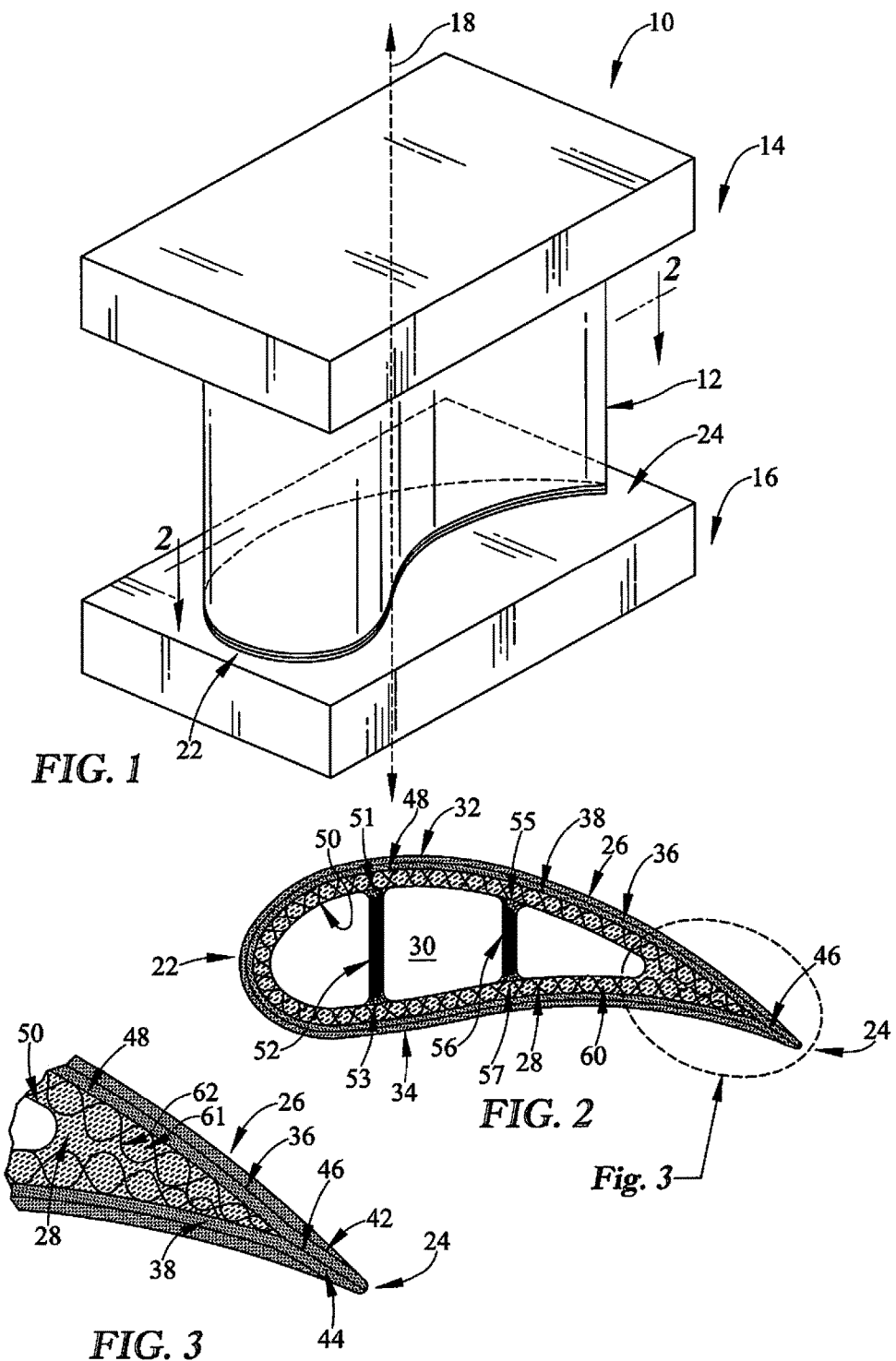

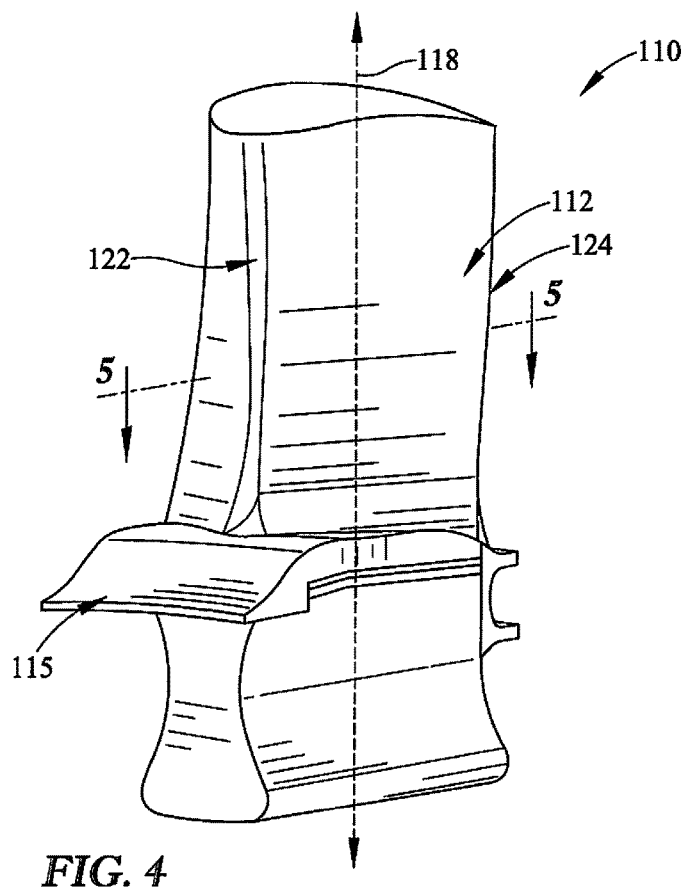
FIG. 4
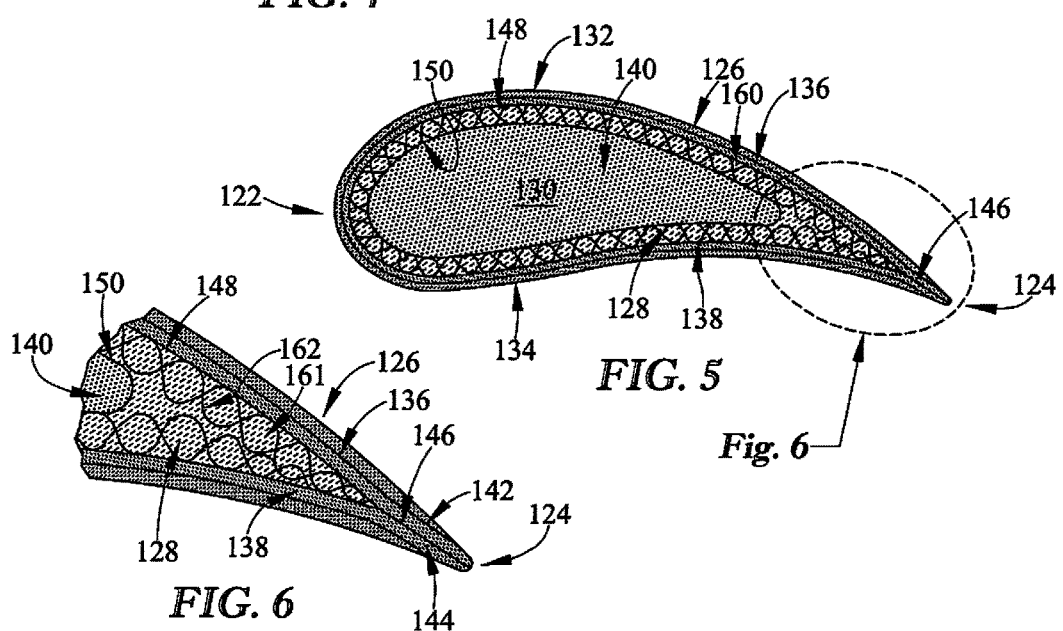
FIG. 5
FIG. 6

COMPOSITE AIRFOIL FOR A GAS TURBINE ENGINE

CROSS REFERENCE TO RELATED APPLICATIONS

This application claims priority to and the benefit of U.S. Provisional Patent Application No. 62/053,551, filed 22 Sep. 2014, the disclosure of which is now expressly incorporated herein by reference.

FIELD OF THE DISCLOSURE

The present disclosure relates generally to airfoils of gas turbine engines, and more specifically to airfoils constructed from composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the mixture is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high temperature materials and/or to be actively cooled by supplying relatively cool air to the vanes and blades. To this end, some airfoils for vanes and blades are being made from composite materials adapted to withstand very high temperatures. Design and manufacture of vanes and blades from composite materials presents challenges because of the complex geometry and strength required for the parts.

SUMMARY

The present disclosure may comprise one or more of the following features and combinations thereof.

According to one aspect of the present disclosure, an airfoil for a gas turbine engine may include an interior layer of ceramic matrix composite material having an exterior surface that faces away from a core of the airfoil and an interior surface that faces the core of the airfoil, and an exterior wrap of ceramic matrix composite material bonded to the exterior surface of the interior layer. The interior layer may include a ceramic-containing matrix material and a tube of ceramic-containing reinforcing fibers suspended in the ceramic-containing matrix material. The exterior wrap may include at least one sheet containing a ceramic-containing matrix material and ceramic-containing reinforcing fibers suspended in the ceramic-containing matrix material. The core of the airfoil may extend along an axis, and the tube of ceramic-containing reinforcing fibers included in the interior layer may extend all the way around the axis without forming a seam that extends along the axis.

In some embodiments, the tube of ceramic-containing reinforcing fibers included in the interior layer may include reinforcing fibers that are woven together. The tube of ceramic-containing reinforcing fibers included in the interior layer may include reinforcing fibers that are braided together. The airfoil may have a leading edge and a trailing edge, and the exterior wrap may form a seam at the trailing edge of the airfoil that extends parallel to the axis.

In some embodiments, the airfoil may include at least one reinforcing rib extending through the core between a first portion of the interior surface and a second portion of the interior surface. The at least one reinforcing rib may include ceramic reinforcing fibers suspended in a ceramic matrix material.

In some embodiments, the core of the airfoil may be substantially hollow. The core of the airfoil may include a ceramic foam material.

According to another aspect of the present disclosure, an airfoil for a gas turbine engine may include an exterior wrap of ceramic matrix composite material having an exterior surface that defines a shape of the airfoil and an interior surface that faces a core of the airfoil, and an interior layer of ceramic matrix composite material bonded to the interior surface of the exterior wrap. The exterior wrap may include at least one sheet containing a ceramic-containing matrix material and ceramic-containing reinforcing fibers suspended in the ceramic-containing matrix material. The interior layer may include a ceramic-containing matrix material and a tube of ceramic-containing reinforcing fibers suspended in the ceramic-containing matrix material. The tube of ceramic-containing reinforcing fibers included in the interior layer may extend around an axis seamlessly.

In some embodiments, the tube of ceramic-containing reinforcing fibers included in the interior layer may include reinforcing fibers that are woven together. The tube of ceramic-containing reinforcing fibers included in the interior layer may include reinforcing fibers that are braided together. The airfoil may have a leading edge and a trailing edge, and the exterior wrap may form a seam at the trailing edge of the airfoil that extends along the axis.

In some embodiments, the interior layer may be directly bonded to the exterior wrap opposite the trailing edge of the airfoil. The interior layer and the exterior wrap may be directly bonded together around the axis.

In some embodiments, the core of the airfoil may be substantially hollow. The core of the airfoil may include a ceramic foam material. The tube of the interior layer may include at least one reinforcing rib extending through the core.

According to yet another aspect of the present disclosure, a method of producing an airfoil for a gas turbine engine includes creating a preform tube of ceramic reinforcing fibers, suspending the preform tube in ceramic-containing matrix material by (i) positioning the preform tube around an axis and (ii) curing the ceramic-containing matrix material applied to the preform tube to form an interior layer, wrapping at least one sheet of prepreg ceramic matrix composite material around the preform tube or the interior layer, curing ceramic matrix material applied to the at least one sheet to form an exterior wrap and to bond the exterior wrap to the interior layer, and forming ribs and/or a formed reinforcement in a core defined by the interior layer.

In some embodiments, creating the preform tube of ceramic reinforcing fibers may include creating the preform tube of ceramic reinforcing fibers by weaving, braiding, knitting, knotting or the like. The method may further include forming a ceramic foam material into the core.

These and other features of the present disclosure will become more apparent from the following description of the illustrative embodiments.

BRIEF DESCRIPTION OF THE DRAWINGS

FIG. 1 is a perspective view of a vane adapted for use in a gas turbine engine that includes an airfoil;

FIG. 2 is a cross-sectional view of the airfoil of FIG. 1 showing various components of the airfoil;

FIG. 3 is a detail view of a portion of the airfoil of FIG. 2;

FIG. 4 is a perspective view of a blade adapted for use in a gas turbine engine that includes another airfoil;

FIG. 5 is a cross-sectional view of the airfoil of FIG. 4 showing various components of the airfoil; and FIG. 6 is a detail view of a portion of the airfoil of FIG. 5.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Referring now to FIG. 1, a static vane 10 adapted for use in a turbine section of a gas turbine engine illustratively includes an airfoil 12. The airfoil 12 extends between outer and inner platforms 14, 16 of the vane 10 along an axis 18. Although the platforms 14, 16 are shown as being substantially rectangular-shaped in FIG. 1, each of the platforms 14, 16 extends circumferentially about a longitudinal axis (not shown) of the gas turbine engine to form a ring. Although only one airfoil 12 extends between the platforms 14, 16 as shown in FIG. 1, the airfoil 12 is one of a plurality of airfoils 12 extending between annular platforms 14, 16. The plurality of airfoils 12 are circumferentially spaced about the longitudinal axis such that the airfoils 12 and the platforms 14, 16 cooperate to direct fluid flowing through the turbine section toward downstream sections of the gas turbine engine. Fluid flows from a leading edge 22 of the airfoil 12 to a trailing edge 24 of the airfoil 12 as suggested in FIG. 1.

The airfoil 12 is illustratively constructed from ceramic matrix composite materials. As discussed in more detail below, the ceramic matrix composite materials include ceramic-containing matrix materials having ceramic-containing reinforcing fibers suspended therein. In one example, the ceramic matrix composite materials may include silicon-carbide reinforcing fibers suspended in a silicon-carbide matrix. In another example, the ceramic matrix composite materials may include another ceramic-based matrix material and reinforcing fibers suspended in the matrix material.

Referring now to FIG. 2, a cross-sectional view of the airfoil 12 taken along a line 2-2 in FIG. 1 is shown. The airfoil 12 includes an exterior wrap 26 of ceramic matrix composite material, an interior layer 28 of ceramic matrix composite material bonded to the exterior wrap 26 so that the interior layer 28 and exterior wrap 26 are substantially directly interconnected around the axis 18, and an internal core 30 extending along the axis 18. The exterior wrap 26 extends along the axis 18 and fully wraps around the axis 18 such that the exterior wrap 26 defines a suction side 32 of the airfoil 12 and a pressure side 34 of the airfoil 12 opposite the suction side 32. The interior layer 28 is coupled to the exterior wrap 26 and extends along and around the axis 18 in similar fashion to the exterior wrap 26 such that the interior layer 28 defines the core 30. The core 30 is surrounded by the interior layer 28 and the exterior wrap 26 and is substantially hollow in the illustrative embodiment to allow for the flow of cooling air through the airfoil as shown in FIG. 2. In some embodiments, the core 30 may be filled with foam, comprise filler material, or other materials.

The exterior wrap 26 of the airfoil 12 illustratively includes a first sheet 36 that is bonded to a second sheet 38 as shown in FIGS. 2-3. The first sheet 36 is positioned radially outwardly of the second sheet 38 relative to the core 30, and the first sheet 36 defines the shape and exterior profile of the airfoil 12. The exterior wrap 26 is wrapped around the axis 18 so that end portions 42, 44 of the second sheet 38 engage one another, thereby forming a seam 46 at the trailing edge of the airfoil 12 as best seen in FIG. 3. The seam 46 extends parallel to the axis 18 as suggested in FIGS. 1-3.

Each of the sheets 36, 38 of the exterior wrap 26 illustratively includes a ceramic-containing matrix material and ceramic-containing reinforcing fibers suspended in the ceramic-containing matrix material. The sheets 36, 38 may be made from a lay-up of a plurality of ceramic-containing fibers that are initially formed to a desired shape. At this initial stage, the sheets 36, 38 may be referred to as fiber preform or prepreg sheets, and the fiber preform sheets may include: filament windings, braided, knotted, or woven fibers, two-dimensional and three-dimensional fabrics, uni-directional fabrics, and non-woven textiles. Following the initial lay-up stage, the sheets 36, 38 may be infiltrated or impregnated with a ceramic-containing matrix material so that the ceramic-containing reinforcing fibers are suspended in the ceramic-containing matrix material. The "fiber preform" sheets 36, 38 may be infiltrated by the matrix material by any number of the following processes: chemical vapor deposition, chemical vapor infiltration, pyrolysis, chemical reaction, sintering, or electrophoresis.

The interior layer 28 of the airfoil 12 illustratively includes an exterior surface 48 and an interior surface 50 opposite the exterior surface 48 as shown in FIG. 2. The exterior surface 48 is positioned radially outwardly of the interior surface 50 relative to the core 30 such that the exterior surface 48 faces away from the core 30 and the interior surface 50 faces the core 30. The exterior wrap 26 of the airfoil 12 is bonded via the matrix infiltration process to the exterior surface 48 of the interior layer 28 as shown in FIG. 2.

The interior layer 28 of the airfoil 12 also includes a ceramic-containing matrix material 61 and a tube of ceramic-containing reinforcing fibers 62 suspended in the ceramic-containing matrix material 61. The tube of ceramic-containing reinforcing fibers 62 may be infiltrated by the ceramic-containing matrix material 61 by one of the infiltration processes discussed above for the sheets 36, 38 so that the tube of reinforcing fibers 62 is suspended in the matrix material 61 following infiltration.

In one example, the tube of ceramic-containing reinforcing fibers 62 of the interior layer 28 includes reinforcing fibers that are woven together. In another example, the tube of ceramic-containing reinforcing fibers 62 of the interior layer 28 includes reinforcing fibers that are braided together. In yet another example, the tube of ceramic-containing reinforcing fibers 62 of the interior layer 28 includes reinforcing fibers that are knotted together. In any case, the tube of ceramic-containing reinforcing fibers 62 extends fully around the axis 18 seamlessly (i.e., free of any seams that extend along the axis 18).

In the illustrative embodiment, the airfoil 12 also includes reinforcing ribs 52, 56 that extend through the core 30 between opposing portions of the interior surface 50 of the interior layer 28 as shown in FIG. 2. The reinforcing rib 52 extends between a portion 51 of the interior surface 50 and a portion 53 of the interior surface 50 opposite the portion 51. The reinforcing rib 56 extends between a portion 55 of the interior surface 50 and a portion 57 of the interior surface 50 opposite the portion 55. In the illustrative embodiment, each rib is made from ceramic-containing matrix material suspending ceramic reinforcing fibers. Although only the two reinforcing ribs 52, 56 are shown in FIG. 2, the interior layer 28 may include more or less reinforcing ribs spaced apart in three dimensions depending upon the structural reinforcement or cooling desired for the airfoil 12.

Referring now to FIG. 3, an enlarged cross-sectional view of a shaped end portion of the airfoil 12 is shown. As suggested in FIGS. 2-3, the interior layer 28 is positioned relative to the exterior wrap 26 to minimize voids between the interior layer 28 and the exterior wrap 26. Therefore, in the illustrative embodiment, voids are substantially absent between the interior layer 28 and the exterior wrap 26 as shown in FIG. 3.

The substantial absence of voids between the interior layer 28 and the exterior wrap 26 of the airfoil 12 allows little or no filler material (sometimes called noodle) to be used to fill those voids. Accordingly, a reduced number of components are used during the fabrication process of the airfoil 12. The substantial reduction or complete elimination of filler material also serves to simplify the lay-up process discussed above and enhances the repeatability of the overall fabrication process of the airfoil 12. Finally, the substantial absence of voids between the interior layer 28 and the exterior wrap 26 lends to improved mechanical properties of the airfoil 12, particularly in the proximity of the trailing edge 24.

Although voids are substantially absent between the interior layer 28 and the exterior wrap 26 of the airfoil 12 in the illustrative embodiment shown in FIG. 3, voids may be minimally present between the interior layer 28 and the exterior wrap 26 in other embodiments. As such, a filler material may be inserted in the voids so that no structurally significant voids remain between the interior layer 28 and the exterior wrap 26 following the filler material insertion.

Referring now to FIG. 4, a blade 110 adapted for use in a turbine section of a gas turbine engine illustratively includes an airfoil 112. The airfoil 112 extends upwardly away from a platform 115 of the blade 110 along an axis 118. Although only one blade 110 (and one airfoil 112) is shown in FIG. 4, the airfoil 112 is one of a plurality of airfoils 112 included in the turbine section. The plurality of airfoils 112 are supported by and circumferentially spaced about a disk that is rotatable about a longitudinal axis of the gas turbine engine. Fluid is directed toward the airfoils 112 from a plurality of static or stationary vanes (e.g., the vane 10 described in FIGS. 1-3) included in the turbine section. Fluid flows from a leading edge 122 of the airfoil 112 to a trailing edge 124 of the airfoil 112, thereby causing the plurality of turbine blades to rotate to drive other rotating components of the gas turbine engine.

The airfoil 112 is illustratively constructed of ceramic matrix composite materials. As discussed in more detail below, the ceramic matrix composite materials include ceramic-containing matrix materials having ceramic-containing reinforcing fibers suspended therein. In one example, the ceramic matrix composite materials may include silicon-carbide reinforcing fibers suspended in a silicon-carbide matrix. In another example, the ceramic matrix composite materials may include another ceramic-based material that includes reinforcing fibers suspended in a matrix material.

Referring to FIG. 5, a cross-sectional view of the airfoil 112 taken along a line 5-5 in FIG. 4 is shown. The airfoil 112 shown in FIGS. 5-6 is substantially similar to the airfoil 12 shown in FIGS. 2-3 and described herein. The airfoil 112 includes an exterior wrap 126 of ceramic matrix composite material, an interior layer 128 of ceramic matrix composite material bonded to the exterior wrap 126 so that the interior layer 128 and exterior wrap 126 are substantially directly interconnected around the axis 118, and an internal core 130 extending along the axis 118 as shown in FIG. 5. The exterior wrap 126 extends along the axis 118 and fully wraps around the axis 118 such that the exterior wrap 126 defines a suction side 132 of the airfoil 112 and a pressure side 134 of the airfoil 112 opposite the suction side 132 as shown in FIG. 5. The interior layer 128 is coupled to the exterior wrap 126 and extends along and around the axis 118 in similar fashion to the exterior wrap 126 such that the interior layer 128 defines the core 130 as shown in FIG. 5. The core 130 is surrounded by the interior layer 128 and the exterior wrap 126 as shown in FIG. 5.

The exterior wrap 126 of the airfoil 112 illustratively includes a first sheet 136 that is bonded to a second sheet 138 as shown in FIGS. 5 and 6. The first sheet 136 is positioned radially outwardly of the second sheet 138 relative to the core 130, and the first sheet 136 defines the shape and exterior profile of the airfoil 112 as shown in FIG. 5. The exterior wrap 126 is wrapped around the axis 118 so that end portions 142, 144 of the second sheet 138 engage one another, thereby forming a seam 146 at the trailing edge 124 of the airfoil 112 as best seen in FIG. 6. The seam 146 extends parallel to the axis 118 as suggested in FIGS. 4-6.

Each of the sheets 136, 138 of the exterior wrap 126 illustratively includes a ceramic-containing matrix material and ceramic-containing reinforcing fibers suspended in the ceramic-containing matrix material as suggested by FIGS. 5 and 6. The sheets 136, 138 may be made from a lay-up of a plurality of ceramic-containing fibers that are initially formed to a desired shape. At this initial stage, the sheets 136, 138 may be referred to as fiber preform or prepreg sheets, and the fiber preform sheets may include: filament windings, braided, knotted, or woven fibers, two-dimensional and three-dimensional fabrics, unidirectional fabrics, and non-woven textiles. Following the initial lay-up stage, the sheets 136, 138 may be infiltrated or impregnated with a ceramic-containing matrix material so that the ceramic-containing reinforcing fibers are suspended in the ceramic-containing matrix material. The "fiber preform" sheets 136, 138 may be infiltrated by the matrix material by any number of the following processes: chemical vapor deposition, chemical vapor infiltration, pyrolysis, chemical reaction, sintering, or electrophoresis.

The interior layer 128 of the airfoil 112 illustratively includes an exterior surface 148 and an interior surface 150 opposite the exterior surface 148 as shown in FIG. 5. The exterior surface 148 is positioned radially outwardly of the interior surface 150 relative to the core 130 such that the exterior surface 148 faces away from the core 130 and the interior surface 150 faces the core 130 as shown in FIG. 5. The exterior wrap 126 of the airfoil 112 is bonded via the matrix infiltration process to the exterior surface 148 of the interior layer 128 as shown in FIG. 5.

The interior layer 128 of the airfoil 112 also includes a ceramic-containing matrix material 161 and a tube of ceramic-containing reinforcing fibers 162 suspended in the ceramic-containing matrix material 161 as shown in FIG. 6. The tube of ceramic-containing reinforcing fibers 162 shown in FIG. 6 may be infiltrated by the ceramic-containing matrix material 161 by one of the infiltration processes discussed above for the sheets 136, 138 so that the tube of reinforcing fibers 162 is suspended in the matrix material 161 following infiltration.

In one example, the tube of ceramic-containing reinforcing fibers 162 of the interior layer 128 shown in FIG. 6 includes reinforcing fibers that are woven together. In another example, the tube of ceramic-containing reinforcing fibers 162 of the interior layer 128 shown in FIG. 6 includes reinforcing fibers that are braided together. In yet another example, the tube of ceramic-containing reinforcing fibers 162 of the interior layer 128 shown in FIG. 6 includes reinforcing fibers that are knotted together. In any case, the tube of ceramic-containing reinforcing fibers 162 extends fully around the axis 118 seamlessly (i.e., free of any seams that extend along the axis 118) as shown in FIGS. 5 and 6.

Referring now to FIG. 6, an enlarged cross-sectional view of a shaped end portion of the airfoil 112 is shown. As suggested in FIGS. 5 and 6, the interior layer 128 is positioned relative to the exterior wrap 126 to minimize voids between the interior layer 128 and the exterior wrap 126. Therefore, in the illustrative embodiment, voids are substantially absent between the interior layer 128 and the exterior wrap 126 as shown in FIG. 6.

The substantial absence of voids between the interior layer 128 and the exterior wrap 126 of the airfoil 112 allows little or no filler material (sometimes called noodle) to be used to fill those voids as suggested by FIG. 6. Accordingly, a reduced number of components are used during the fabrication process of the airfoil 112. The substantial reduction or complete elimination of filler material as suggested by FIG. 6 also serves to simplify the lay-up process discussed above and enhances the repeatability of the overall fabrication process of the airfoil 112. Finally, the substantial absence of voids between the interior layer 128 and the exterior wrap 126 as suggested by FIG. 6 lends to improved mechanical properties of the airfoil 112, particularly in the proximity of the trailing edge 124.

Although voids are substantially absent between the interior layer 128 and the exterior wrap 126 of the airfoil 112 in the illustrative embodiment shown in FIG. 6, voids may be minimally present between the interior layer 128 and the exterior wrap 126 in other embodiments. As such, a filler material may be inserted in the voids so that no structurally significant voids remain between the interior layer 128 and the exterior wrap 126 following the filler material insertion.

Unlike the core 30 of the airfoil 12, the core 130 of the airfoil 112 is not substantially hollow; rather, the core 130 includes a ceramic foam material 140 as shown in FIGS. 5-6. The ceramic foam material 140 may be defined by an open-celled structure that looks similar to a sponge and is made from an interconnecting lattice of ceramic. The structure may have a regular and repetitive pattern which gives the foam material 140 substantially uniform strength and performance throughout, and the open-celled structure may have a high strength to weight ratio. In addition, the ceramic foam material 140 may be designed to maximize thermal shock resistance, increase or decrease thermal conductivity, and generally provide high temperature use capability. The porosity of the ceramic foam material 140 may be in the range of 75-90%. The ceramic foam material 140 may also be operable to distribute cooling fluid throughout the space occupied by the ceramic foam material 140.

Unlike the airfoil 12, the airfoil 112 does not include reinforcing ribs that extend through the core 130. The ceramic foam material 140 included in the core 130 provides structural reinforcement for the airfoil 112 in place of the structural reinforcement provided by the reinforcing ribs 52, 56 for the airfoil 12. However, in some embodiments, ribs may be used in conjunction with foam material in the core of an airfoil.

Referring to FIGS. 1-6, a method of producing the airfoils 12, 112 includes the following: creating a preform tube of ceramic reinforcing fibers 62, 162, suspending the preform tube 62, 162 in ceramic-containing matrix material 61, 161 by (i) positioning the preform tube 62, 162 around the axis 18, 118 and (ii) curing the ceramic-containing matrix material 61, 161 applied to the preform tube 62, 162 to form the interior layer 28, 128, wrapping at least one sheet of prepreg ceramic matrix composite material around the preform tube 62, 162 or the interior layer 28, 128, curing ceramic matrix material applied to the at least one sheet to form the exterior wrap 26, 126 and to bond the exterior wrap 26, 126 to the interior layer 28, 128, and forming ribs 52, 56 and/or a formed reinforcement in the core 30, 130 defined by the interior layer 28, 128. Creating the preform tube 62, 162 of ceramic reinforcing fibers may include creating the preform tube 62, 162 of ceramic reinforcing fibers by weaving, braiding, knitting, knotting or the like. As best seen in FIGS. 4-6, the method may also include forming the ceramic foam material 140 into the core 130.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil for a gas turbine engine, the airfoil comprising
    an interior layer of ceramic matrix composite material having an exterior surface that faces away from a core of the airfoil and an interior surface that faces the core of the airfoil, the interior layer including a ceramic-containing matrix material and a single preform tube of ceramic-containing reinforcing fibers that are bound together and suspended in the ceramic-containing matrix material, and
    an exterior wrap of ceramic matrix composite material bonded to the exterior surface of the interior layer, the exterior wrap including at least one sheet containing a ceramic-containing matrix material and ceramic-containing reinforcing fibers suspended in the ceramic-containing matrix material,
    wherein the core of the airfoil comprises a void that extends along an axis, the airfoil has a leading edge and a trailing edge and the exterior wrap forms a seam at the trailing edge of the airfoil that extends parallel to the axis, and the tube of ceramic-containing reinforcing fibers included in the interior layer extends along each of a pressure side and a suction side of the airfoil all the way around the axis without forming a seam that extends along the axis, and
    wherein the tube of ceramic-containing reinforcing fibers extends along an entire length of the interior layer and defines a surface of the void of the core of the airfoil.

2. The airfoil of claim 1, wherein the tube of ceramic-containing reinforcing fibers included in the interior layer includes reinforcing fibers that are woven together.

3. The airfoil of claim 1, wherein the tube of ceramic-containing reinforcing fibers included in the interior layer includes reinforcing fibers that are braided together.

4. The airfoil of claim 1, wherein the airfoil includes at least one reinforcing rib extending through the core between a first portion of the interior surface and a second portion of the interior surface.

5. The airfoil of claim 4, wherein the at least one reinforcing rib includes ceramic reinforcing fibers suspended in a ceramic matrix material.

6. The airfoil of claim 1, wherein the core of the airfoil is hollow.

7. The airfoil of claim 1, wherein the core of the airfoil contains a ceramic foam material.

8. An airfoil for a gas turbine engine, the airfoil comprising
an exterior wrap of ceramic matrix composite material having an exterior surface that defines a shape of the airfoil and an interior surface that face a core of the airfoil, the exterior wrap including at least one sheet containing a ceramic-containing matrix material and ceramic-containing reinforcing fibers suspended in the ceramic-containing matrix material, and
an interior layer of ceramic matrix composite material bonded to the interior surface of the exterior wrap, the interior layer including a ceramic-containing matrix material and a single preform tube of ceramic-containing reinforcing fibers that are bound together and suspended in the ceramic-containing matrix material,
wherein the core of the airfoil comprises a void that extends along an axis, the airfoil has a leading edge and a trailing edge and the exterior wrap forms a seam at the trailing edge of the airfoil that extends parallel to the axis, and the tube of ceramic-containing reinforcing fibers included in the interior layer extends along each of a pressure side and a suction side of the airfoil around the axis seamlessly, and
wherein the tube of ceramic-containing reinforcing fibers extends from adjacent the leading edge of the airfoil to adjacent the trailing edge of the airfoil and defines a surface of the void of the core of the airfoil.

9. The airfoil of claim 8, wherein the tube of ceramic-containing reinforcing fibers included in the interior layer includes reinforcing fibers that are woven together.

10. The airfoil of claim 8, wherein the tube of ceramic-containing reinforcing fibers included in the interior layer includes reinforcing fibers that are braided together.

11. The airfoil of claim 8, wherein the interior layer is directly bonded to the exterior wrap opposite the trailing edge of the airfoil.

12. The airfoil of claim 11, wherein the interior layer and the exterior wrap are directly bonded together around the axis.

13. The airfoil of claim 8, wherein the core of the airfoil is hollow.

14. The airfoil of claim 8, wherein the core of the airfoil includes a ceramic foam material.

15. The airfoil of claim 8, wherein the tube of the interior layer includes at least one reinforcing rib extending through the core.

16. A method of producing an airfoil for a gas turbine engine, the method comprising
creating a single preform tube of ceramic reinforcing fibers that are bound together,
suspending the preform tube in ceramic-containing matrix material by (i) positioning the preform tube around an axis such that the preform tube extends along each of a pressure side and a suction side of the airfoil without forming a seam that extends along the axis and (ii) curing the ceramic-containing matrix material applied to the preform tube to form an interior layer,
wrapping at least one sheet of prepreg ceramic matrix composite material around the preform tube or the interior layer,
curing ceramic matrix material applied to the at least one sheet to form an exterior wrap and to bond the exterior wrap to the interior layer,
forming ribs and/or a formed reinforcement in a core defined by the interior layer,
wherein (i) curing the ceramic matrix material to form the exterior wrap includes forming a seam at a trailing edge of the airfoil that extends parallel to the axis and (ii) positioning the preform tube around the axis includes positioning the preform tube around the axis such that the preform tube extends along each of the pressure and suction sides of the airfoil without forming a seam that extends along the axis, and
extending the tube of ceramic-containing reinforcing fibers along an entire length of the interior layer to define a surface of a void of the core of the airfoil.

17. The method of claim 16, wherein creating the preform tube of ceramic reinforcing fibers comprises creating the preform tube of ceramic reinforcing fibers by weaving, braiding, knitting, or knotting.

18. The method of claim 16, comprising forming a ceramic foam material into the core.

\* \* \* \* \*